March 29, 1938.    R. HARDING, JR    2,112,527
SOUND AND PICTURE SYSTEM
Filed Nov. 7, 1931    3 Sheets-Sheet 1
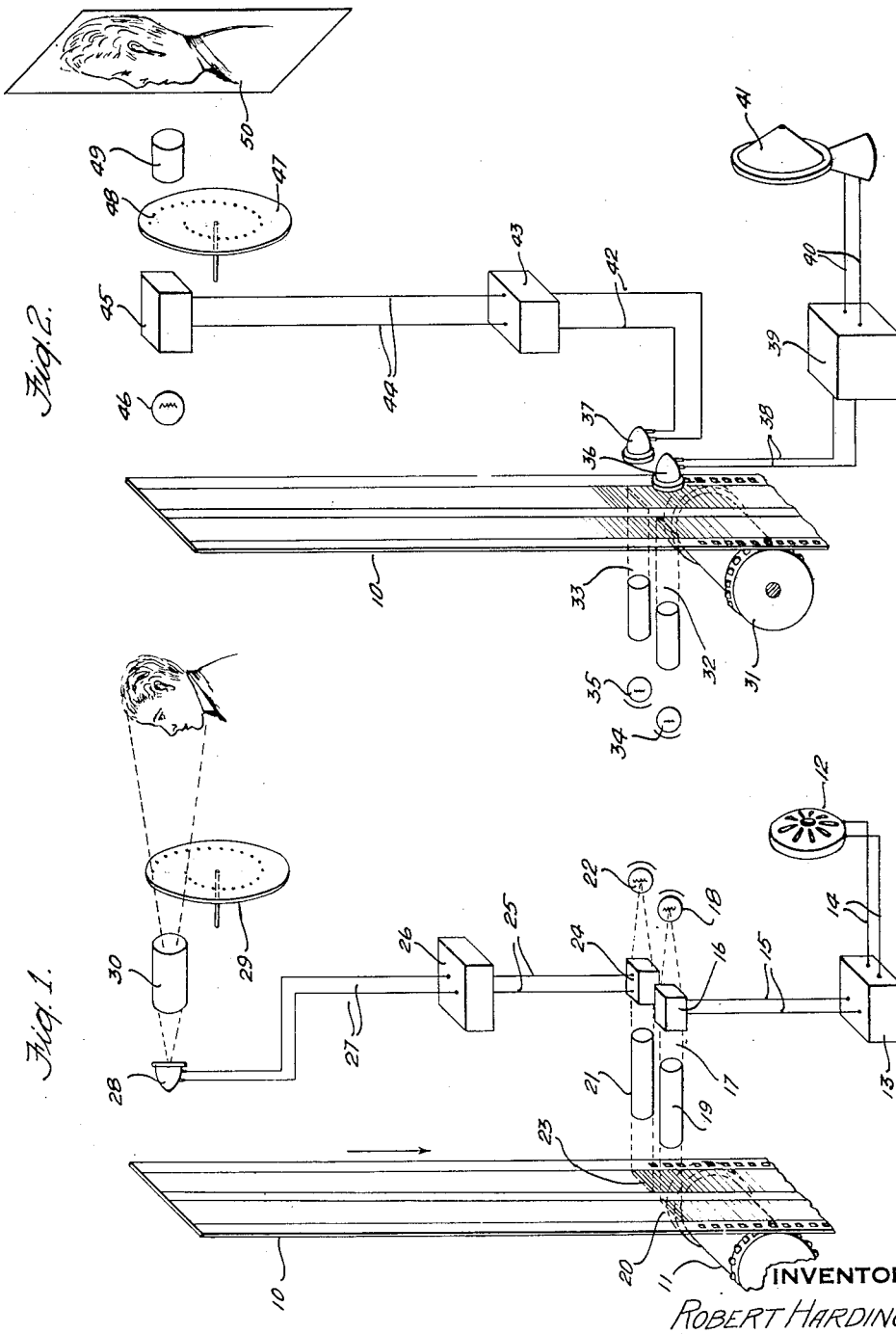
INVENTOR
ROBERT HARDING JR.
BY ATTORNEY March 29, 1938.   R. HARDING, JR   2,112,527
SOUND AND PICTURE SYSTEM
Filed Nov. 7, 1931   3 Sheets-Sheet 2
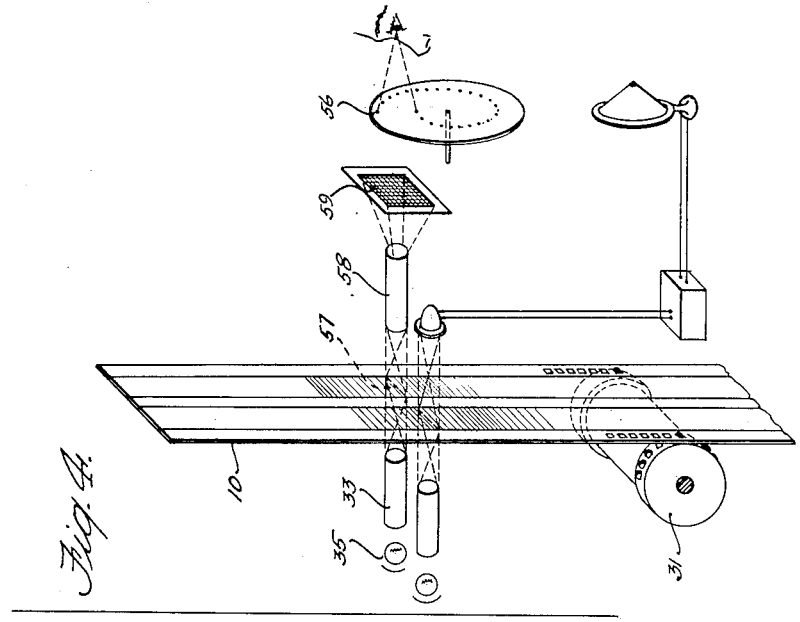
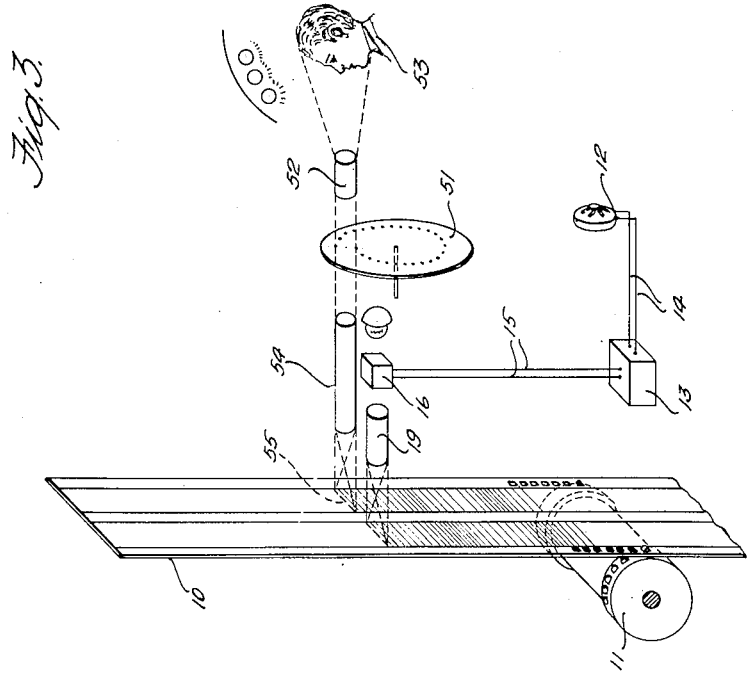
INVENTOR
ROBERT HARDING JR
BY   ATTORNEY March 29, 1938.   R. HARDING, JR   2,112,527
SOUND AND PICTURE SYSTEM
Filed Nov. 7, 1931   3 Sheets-Sheet 3
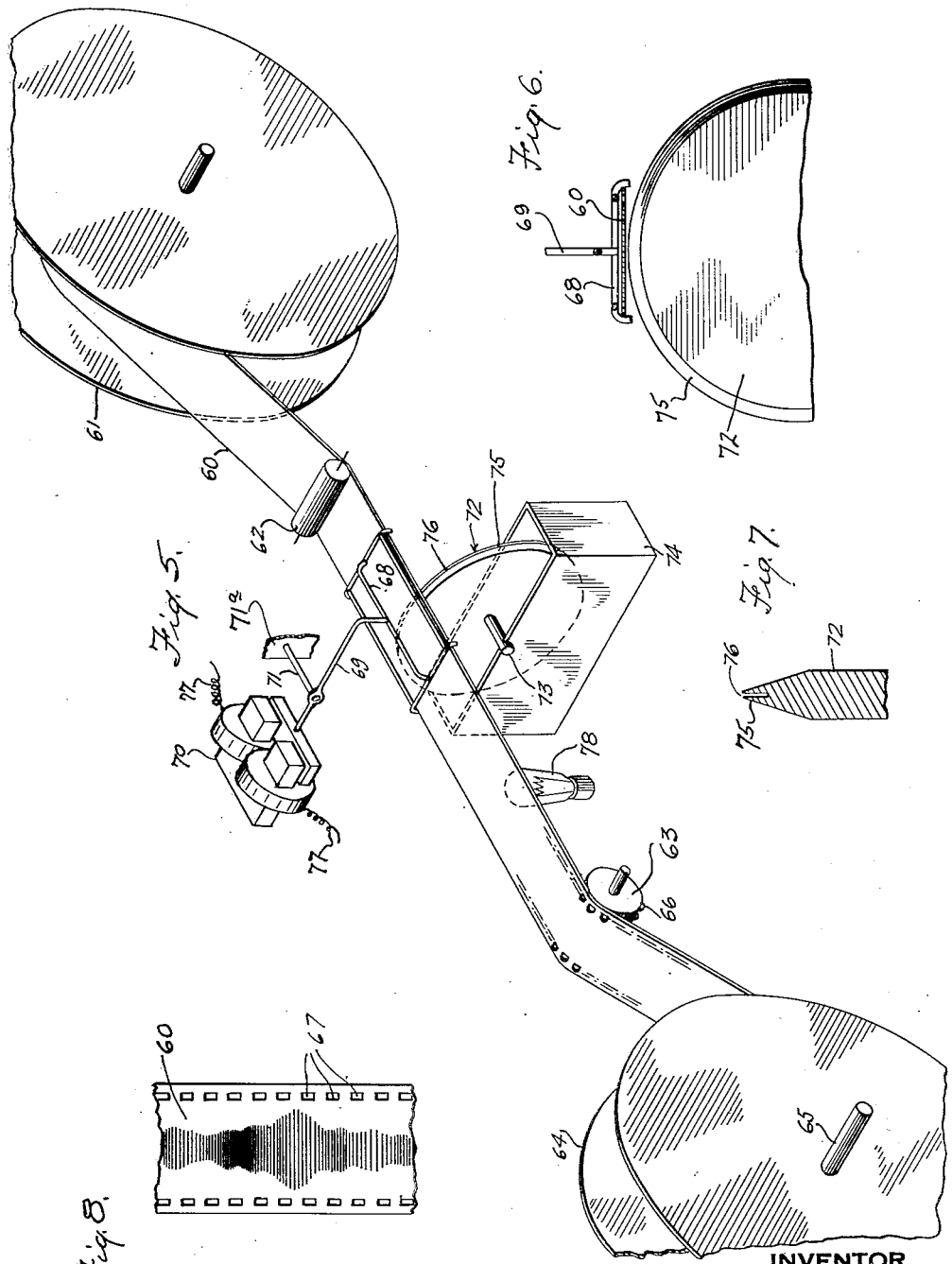
INVENTOR
ROBERT HARDING, JR.
BY   ATTORNEY Patented Mar. 29, 1938

2,112,527

UNITED STATES PATENT OFFICE 2,112,527

SOUND AND PICTURE SYSTEM

Robert Harding, Jr., Elmsford, N. Y., assignor, by mesne assignments, to National Television Corporation, Wilmington, Del., a corporation of Delaware Application November 7, 1931, Serial No. 573,546

7 Claims. (Cl. 178—5.6)

This invention relates to sound moving pictures and to a system for taking and projecting the pictures as well as to the apparatus to be used therewith.

Heretofore, it has been the practice in making motion pictures to take a series of photographs in quick succession upon a light sensitive film, and after developing and making a positive film, to draw the film through a machine which intermittently projects the photographs in quick succession upon a screen, the screen being darkened while one photograph is replaced by another and the device depending upon the persistence of vision of the observer so that it appears to him as a natural moving picture. At the same time that the photographs are taken on the film a sound record is placed on another portion of the film at a point generally spaced slightly ahead of the picture being taken, such sound track being reproduced by means of a light sensitive cell when the film is drawn at a constant speed through a light beam. In the apparatus for taking such pictures, therefore, and reproducing them there must of necessity be a device for intermittently moving the film past a picture gate, and at the same time a device for constantly moving the film at a very even speed past a light beam for either photographing the sound track on the film or reproducing sound from the photographed sound track. The device for moving the film intermittently is rather complicated, and makes it extremely difficult to draw the film at a constant enough speed for the sound apparatus. It has heretofore been found necessary to use all sorts of vibration dampening mechanisms to prevent any of the vibrations from the intermittent mechanism from affecting the film as it passes the light beam for sound photography or reproduction.

It is one of the objects of the invention, therefore, to provide a system and an apparatus for taking and projecting sound motion pictures in which the film is drawn at a constant speed for taking and reproducing the picture as well as the sound so that no intermittent motion is necessary in the apparatus.

Another object of the invention is to provide an apparatus and a system for taking sound motion pictures in which it is possible to do the actual photographing of sound and picture in a laboratory which may be suitably darkened and sound proofed while the pictures and sound may be taking place at a remote point, either indoors or out, and without the usual limitations accompanying photographic work, such as lighting effects, condition of the weather, etc.

Still another object of the invention is to provide a system and apparatus for taking and projecting motion pictures with sound accompaniment in which both the picture and sound may be broadcast over radio apparatus or sent over wires electrically to distant points simultaneously with the manufacture of the film.

A still further object of the invention is to provide a moving picture and sound system and apparatus in which the picture is absolutely synchronized with the sound and cannot possibly get out of synchrony for any reason whatsoever.

Another object of the invention is to provide a means for mechanically recording impulses upon a record strip.

Other objects and objects relating particularly to the means of assembling the various parts will be apparent as the description of the invention proceeds.

The invention is illustrated in the accompanying drawings in which:

Fig. 1 is a diagrammatic perspective view of one form of apparatus for taking the pictures;

Fig. 2 is a diagrammatic perspective view of one form of apparatus for reproducing the picture and sound;

Fig. 3 is a diagrammatic perspective view of a modified form of recording apparatus;

Fig. 4 is a diagrammatic perspective view of a similar reproducing apparatus;

Fig. 5 is a diagrammatic perspective view of a device for mechanically recording impulses on a record strip;

Fig. 6 is a sectional view through the device in the plane of the recording action;

Fig. 7 is a sectional view of a portion of the periphery of the inking roller used in the device of Fig. 5; and Fig. 8 is an elevational view of a portion of a recorded paper strip.

I accomplish the objects of the invention by scanning the object to be photographed with a television scanning device and photographing the light and shade impulses picked up by the scanning device upon the film simultaneously with the sound vibrations which are also photographed thereon. Thus in Fig. 1 a film 10 is drawn at a constant speed by a sprocket 11 through the apparatus. Suitable guides as well as other sprockets and reels for carrying the film both before and after use may be provided but have been omitted as unnecessary in describing the invention. A microphone 12 may be connected to an amplifier 13 by means of wires 14 and from the amplifier a pair of wires 15 may lead to a light modulating device 16 which modulates a beam of light 17 from a light source 18 in accordance with the variations picked up by the microphone 12. A lens system 19 is provided for projecting a very fine line 20 of light on the film and as the film is moved past the light beam a series of light and dark lines corresponding to the sound vibrations are photographed on the film.

I prefer to have the sound track take up not more than half of the space across the film and adjacent the optical system 19 I provide a second optical system 21 which is adapted to focus light from a second light source 22 on to the film 10 in a fine line 23 upon the other half of the film. A second light modulator 24 is adapted to modulate the light in accordance with the succession of light and shade produced by scanning the object to be photographed. This modulator 24 is connected by means of a pair of wires 25 to an amplifier 26 the input of which is connected by means of wires 27 to a light sensitive cell 28. A scanning disc 29 is adapted to be rotated at a speed relatively faster than the drum or sprocket 11 but at a fixed ratio therewith and in front of the object to be photographed. An optical system 30 is placed in front of the light sensitive cell 28 for affecting the light sensitive cell in accordance with the scanned light and shade parts of the objects. The scanning disc may be placed far enough from the optical system so that the disc intercepts the field of view at any given instant except for one tiny hole through which the light may pass, or the scanning disc may be placed between the light sensitive cell and the optical system in which case an image of the object to be photographed is projected upon the scanning disc which will, therefore, permit the light from only one spot on the image to reach the light sensitive cell at any given instant.

It will be seen from the above description that as the film 10 is moved at a constant speed through the apparatus a sound track is produced on one side and a picture track is produced on the other side which is in accordance with the light and shade vibrations determined by the scanning disc.

In reproducing the picture and sound practically the reverse process is used. The film 10 may be drawn through the projection machine in a similar manner to the recording machine except that the light beams are directed against light sensitive cells which pick up the variations of sound and of light and shade on the film and transmit them respectively to sound amplifying apparatus and to a suitable scanning television apparatus for producing the image. The film 10 (Fig. 2) is drawn constantly through the reproducing apparatus by a sprocket 31 and two beams of light 32 and 33 are directed against the film by light sources 34 and 35 respectively, while light sensitive cells 36 and 37 are placed on the opposite side of the film to receive the light from the two tracks. The light beams 32 and 33 are of course each focused in a fine line on the film and illuminate or pass through one vibration at a time as nearly as is possible.

The light sensitive cell 36 is connected by means of wires 38 to an amplifier 39 which is in turn connected by means of wires 40 to a loud speaker 41 from which the sound is thrown out into the room in accordance with the sound vibration track on the film.

The light sensitive cell 37 may be connected by means of a pair of wires 42 to an amplifier 43 which may in turn be connected by wires 44 to a light modulating device 45. A light source 46 may direct a beam of light through the modulating device 45 and through the scanning disc 47, which is rotated at the same ratio of speed with respect to the film driving sprocket 31 as the scanning disc 29 of Fig. 1 is rotated with respect to the sprocket 11. The light thrown or projected against the scanning disc 47 passes successively through the holes 48 in the scanning disc and these successive variations of light and shade are projected by means of an optical system 49 upon a screen 50 where the picture will appear.

In the figures already described it will be noted that the construction is particularly applicable for the separation of the actual scanning means and the means for placing the light track upon a film, the same thing being true with the microphone. Thus it is possible to have the film subjected to the modulated light in a laboratory where all the necessary equipment is at hand and convenient for use and where all the desirable conditions may be maintained for the proper treatment thereof. The scanning device and microphone on the other hand may be carried in a small box no larger perhaps than a suit case and placed at any desired location for taking outdoor scenes or indoor scenes and the impulses sent over wires provided for that purpose thus eliminating a large portion of the complicated equipment now used for taking sound moving pictures.

This flexibility of the device is also advantageous with the projection machine for the scanning disc and loud speaker may be separated any distance from the light sensitive cells or even connected only by radio. The film may thus be run through a projection device in a laboratory or broadcasting station and the impulses sent out over two carrier systems similar to television. It is possible, therefore, from a single film to reproduce the program simultaneously at a number of points with a number of separate scanning devices.

It is within the spirit of the invention, however, to simplify the construction shown in Figs. 1 and 2 so that the electrical equipment between the scanning disc and film is eliminated. Thus in Fig. 3 a device for forming the record on the film is illustrated. Here the film 10 is drawn by sprockets 11 as in Fig. 1 but a scanning disc 51 is placed adjacent the film, there being an optical system 52 in front of the scanning disc to project an image of the subject 53 to be photographed upon the scanning disc itself. As the scanning disc rotates, the light from portions of this image is permitted to pass through the holes and another optical system 54 may be provided to direct all of these rays down to a sharp edge 55 on the film 10 as indicated. The microphone and arrangement for producing the sound track is the same as shown in Fig. 1.

In Fig. 4 the construction for projecting or for viewing the scene directly from the film is illustrated. Here the finished film 10 is drawn by the sprocket 31 and the device for reproducing the sound is exactly the same as shown in Fig. 2. However, in this figure a scanning disc 56 is provided adjacent or directly in front of the film 10 and also a light source 35 similar to that shown in Fig. 2. An optical system 33 is shown for concentrating the light from the light source in a fine line 57 on the film. The light rays passing through the fine line 57 pass into another optical system 58 where the rays are spread to cover completely a rectangular translucent screen 59 which is then made to flicker with the light and shade produced as the lines on the picture track pass the light beam. The scanning disc 56 rotating in front of the rectangular screen 59 cuts off all of the screen except that portion behind one of the holes which happens to be moving thereacross and the image, therefore, appears on the surface of the scanning disc.

Such a construction is not as complicated as the construction in Figs. 1 and 2 as the electrical equipment between the scanning disc and film is eliminated, but it is not as flexible, as it is necessary to have the film and scanning disc mounted in the same casing so that if a picture were taken the film would have to be there at the scene. Also in viewing the picture the film would have to be used in conjunction with the immediate device. This makes it more difficult also to project the image on a suitable screen inasmuch as the quantity of light passing through the thin line on the film is small and it is impossible to amplify it after it has been passed through as is the case when the electrical equipment is used. Of course in either case it is necessary to run the scanning disc at a speed which synchronizes with a predetermined ratio of the speed of the film pulling sprocket.

While a scanning disc has been shown in both Figs. 1, 2, 3, and 4 it is evident that any type of scanning apparatus for intercepting a succession of light and shade from an object to be photographed and reproducing that succession of light and shade to form the completed picture may be used with this invention.

In place of the light sensitive cell shown in Fig. 1 a light source may be used which will direct a beam of light toward the object to be photographed, the scanning disc intercepting the beam causing the point of light to scan the face of the subject. A battery of light sensitive cells may then be used positioned so as to receive reflected light from the face of the subject and connected to the amplifier and light modulator as is the cell of Fig. 1.

Also in Fig. 2 instead of the light modulator, which may be preferred, I may use a neon tube which will then flicker in accordance with the variations received by the light sensitive cell 37. The observer will then look directly at the scanning disc and as the neon light flickers behind it he will see the image appear on the surface of the disc.

In Figs. 1 and 2, and 4 there have been shown two separate light sources 18 and 22 in Fig. 1 and 34 and 35 in Figs. 2 and 4, in order to direct light through the film 10, but one light source may be used in each case if desired and a single optical system for projecting the beam of light on a single line across the film. If such a single optical system were used in Fig. 1 the light modulators would have to be between the optical system and the film in order to produce the two tracks of light modulation on the film. Also for projection, care would have to be taken to separate the light thrown through the two tracks.

In the above embodiment of the invention the sound and picture vibration have been described as being formed upon a sensitized strip of film similar to a motion picture film by the action of light upon the light sensitive surface. It may be preferable, however, to use a transparent or semi-transparent paper, which may be provided similar in width to the motion picture film, and print the sound and picture tracks on the film by mechanical means.

In Fig. 5 a means for printing such vibrations upon a strip of transparent material is illustrated. A roll 60 of the transparent paper, which may be a substance similar to the material put out under the trade name of "Cellophane," may be mounted on a suitable reel 61 which may be freely rotatable so as to permit the paper to unwind as it passes through the machine. The strip of transparent paper may be fed down beneath a roller 62 and over a sprocket 63 to a winding reel 64 mounted on a shaft 65. The sprocket 63 may have teeth 66 to engage the holes 67 provided in the edge of the strip of paper similar to the holes which are now provided in a motion picture film and this sprocket 63 is driven at a constant rate of speed by any suitable means (not shown). The shaft 65 for the reel 64 may be driven from the same driving means which rotates the sprocket 63 but a suitable slip clutch (not shown) should be provided to permit the reel 64 to vary in speed of rotation as the paper winds upon it. This driving mechanism may be similar to the driving mechanism of any motion picture projection machine and is not considered necessary to be shown in detail. Between the roller 62 and the sprocket 63 the strip of paper is adapted to pass under a frame work 68 which is mounted on the driving pin 69 of a magnetic speaker unit 70. The driving pin 69 is suitably pivoted upon an arm 71 secured to the frame work 71a of the machine so that longitudinal motion caused by the movement of the strip with respect to the frame 68 will be prevented but vertical motion of the frame caused by the driving pin 69 will be permitted.

Beneath the frame 68 I provide a rotatable disc 72 mounted on a shaft 73 in a suitable receptacle 74 which may be filled with India ink or other liquid adapted to mark the strip of paper when it is brought down against the rotating disc. The disc is preferably ground so that its periphery is a knife edge 75 and this knife edge may be provided with a very fine groove 76 which will carry the ink from the receptacle up around the disc as the disc is rotated. The shaft 73 may be rotated from any part of the driving mechanism as may be convenient. The disc 72 is positioned underneath the frame 68 so that it comes very close to the strip of paper as it passes under the frame and vertical vibration of the frame will cause the paper to intermittently contact with the inked disc. The wires 77 of the unit 70 are connected to the incoming source of electrical oscillations, either from the sound or the picture accompanying the sound, and these oscillations acting on the unit 70 cause the frame 68 to move rapidly up and down pushing the strip of paper against the disc 72 as it rotates and printing a series of lines on the disc in accordance with the vibration, heavy vibrations causing longer lines than light vibrations as the paper is bent down around the periphery of the disc. If desired an electric lamp 78 or other heating device may be placed adjacent the strip as it leaves the inking disc to dry the ink before the strip reaches the sprocket 63.

Both the sound track and picture track may be put upon the strip in this manner and where both are put upon the same strip the printing is done by two discs spaced apart, the strip of paper being first subjected to vibration of the sound, for instance, and then passing over a second disc where it is given the picture vibration. The discs are preferably mounted on shafts which have their axes spaced slightly apart so as to make one track at one side of the paper strip and the other track at the other side, similar to those shown in connection with the motion picture film in the preceding figures.

The space between the disc and paper will determine to a large extent the character of the marks made. If spaced too far away the paper will not receive at all some of the very slight vibrations so that it may be desirable to have the paper normally in slight contact with the disc whereupon the record will consist of a solid inked line down the center of the strip with varying sides corresponding to the ends of the lines shown in Fig. 8.

Of course, the strip need not be positioned exactly in the center as shown but may be placed at one side if desired so that the irregular line formed by the printed lines on one side may be entirely off the paper whereupon the reproduction will have to depend solely on the irregularity of the other side.

By printing the vibration track upon the strip of paper in the above manner a very much cheaper process results as the use of light sensitive film is expensive.

Many other modifications of the invention may be resorted to without departing from the spirit thereof, and I do not, therefore, desire to limit myself to what has been shown and described except as such limitations occur in the appended claims.

What I desire to secure by Letters Patent and claim is:

1. In a device of the class described means to move a sensitized film along a predetermined path, means to scan an object field, direct optical means to reproduce on said film a succession of light and dark lines corresponding to the succession of light and dark impulses obtained by scanning said object field, and means to reproduce on another portion of said film a succession of sound vibrations corresponding to the sound accompanying the scene to be photographed.

2. In a device of the class described means to move a film provided with two tracks of light and shade lines in a predetermined path, means to project light through one of said tracks, means to intercept the light so projected and means to translate it into sound, means to project light through the other of said tracks, and means including a scanning device for intercepting said projected light and translating it into an image.

3. In a device of the class described means to move a film provided with two tracks of light and shade lines in a predetermined path, means to project light through one of said tracks in a thin line, means to intercept the light so projected and translate it into electrical vibrations, means to further translate said electrical vibrations into sound vibrations, means to project light through said second track in a thin line, means to intercept the light so projected and to spread it into a wide beam, and means to scan said beam to form an image.

4. In a device of the class described means to move a film carrying two vibration tracks in a predetermined path, means to direct a thin line of light against said film at one of said tracks, means to intercept the light as it passes through said film and translate it into electrical vibrations, means to translate said electrical vibrations into sound vibrations, means to project light in a thin line against said second track on said film, means to intercept the light passing through said film from said last mentioned means and to spread it into a wide beam, translucent means to intercept said beam, and means to scan said translucent means to form an image.

5. In a device of the class described, a constant light source, means to move a record blank in a predetermined path, means to cause a succession of vibrations recorded thereon to modulate a beam of light from said source, translucent means to intercept said beam, and means to scan said translucent means.

6. In a device of the class described means to move a film provided with two tracks of light and shade lines in a predetermined path, means to project light through one of said tracks, means to intercept the light so projected and to translate it into sound, means to project light through the other of said tracks, means to spread the light projected through said track, translucent means to intercept the light after it has passed through said track, and means to scan said translucent means to form an image.

7. In a vibration recording device means to draw a strip of material through the device, a rotatable disc mounted with its axis substantially parallel to the direction of movement of said strip, means on the periphery of said disc adapted to color said strip when brought in contact therewith, and means to move said strip towards and away from the edge of said disc whereby transverse lines of varying lengths will be formed on said strip.

ROBERT HARDING, Jr.